United States Patent
Chopra et al.

(10) Patent No.: US 10,042,719 B1
(45) Date of Patent: Aug. 7, 2018

(54) OPTIMIZING APPLICATION DATA BACKUP IN SMB

(71) Applicant: EMC Corporation, Hopkinton, MA (US)

(72) Inventors: Shelesh Chopra, Bangalore (IN); Gajendran Raghunathan, Bangalore (IN); Shoukathali Chandrakandi, Kannur (IN); Sainath Gonugunta, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 308 days.

(21) Appl. No.: 14/861,624

(22) Filed: Sep. 22, 2015

(51) Int. Cl.
*G06F 17/00* (2006.01)
*G06F 17/30* (2006.01)
*G06F 11/14* (2006.01)
*G06F 11/16* (2006.01)

(52) U.S. Cl.
CPC ...... *G06F 11/1466* (2013.01); *G06F 11/1662* (2013.01)

(58) Field of Classification Search
CPC ......... G06F 17/30233; G06F 17/30091; G06F 2201/84; G06F 17/30575
See application file for complete search history.

(56) References Cited

U.S. PATENT DOCUMENTS

| 5,778,395 | A | * | 7/1998 | Whiting | G06F 11/1453 |
| 2005/0108487 | A1 | * | 5/2005 | Kobayashi | G06F 3/0611 711/162 |
| 2007/0179999 | A1 | * | 8/2007 | Kamei | G06F 11/1464 |
| 2009/0177718 | A1 | * | 7/2009 | Patterson | G06F 11/1458 |
| 2016/0170666 | A1 | * | 6/2016 | Hsu | G06F 3/0655 711/162 |
| 2016/0224259 | A1 | * | 8/2016 | Ahrens | G06F 3/0619 |

* cited by examiner

*Primary Examiner* — Cheryl Lewis
(74) *Attorney, Agent, or Firm* — Womble Bond Dickinson (US) LLP

(57) ABSTRACT

Embodiments described herein use a file server implementing a network file sharing protocol in an improved backup workflow in a storage system. The file server provides storage services to files stored in a plurality of storage devices via one or more file sharing protocols. In one embodiment, in response to a request to back up data that is received at the file server from an application server, the file server creates a snapshot of the data to be backed up using data stored in a source storage device. The file server sends the created snapshot to the target storage system for storage and sends a first notification to the application server indicating that the snapshot has been backed up in the target storage system. In addition, the application server sends a second notification to a backup server indicating that the data has been backed up.

21 Claims, 9 Drawing Sheets

OPTIMIZING APPLICATION DATA BACKUP IN SMB

FIELD OF THE INVENTION

Embodiments described herein relate generally to data storage systems. More particularly, embodiments described herein relate to backing up data using a backup workflow that includes a file server implementing a network file sharing protocol.

BACKGROUND

Backup of data in a data storage system from network devices can be performed using a network file sharing protocol, which allows multiple devices on a network to access data on the network. In this way, a data storage system can use a network file sharing protocol for centralized management without the need to install and execute client software on one or more network devices and without modifying the network device(s) significantly.

One well known network file sharing protocol is the Server Message Block (SMB), which is mainly used for providing shared access to data (e.g., files), serial ports, and communications between nodes on a network. The set of message packets that defines a particular version of the SMB protocol is called a dialect. The Common Internet File System (CIFS) Protocol is one dialect of SMB.

In at least one presently-available data storage system that uses a network file sharing protocol, the process of backing up data from a source storage device to a target storage device requires an extensive amount of communications between the storage devices, client computers, file servers, and other servers. This can increase response latency, increase network bandwidth, decrease computer resource utilization (e.g., processor, memory and network), and increase inefficiencies in the backup process.

While batching may be used to group the packets and communicate them with fewer transmissions, the number of communications required to perform such backups remains suboptimal.

BRIEF DESCRIPTION OF THE DRAWINGS

Embodiments described herein are illustrated by way of example and not limitation in the figures of the accompanying drawings in which like references indicate similar elements.

DETAILED DESCRIPTION

Figure 1:
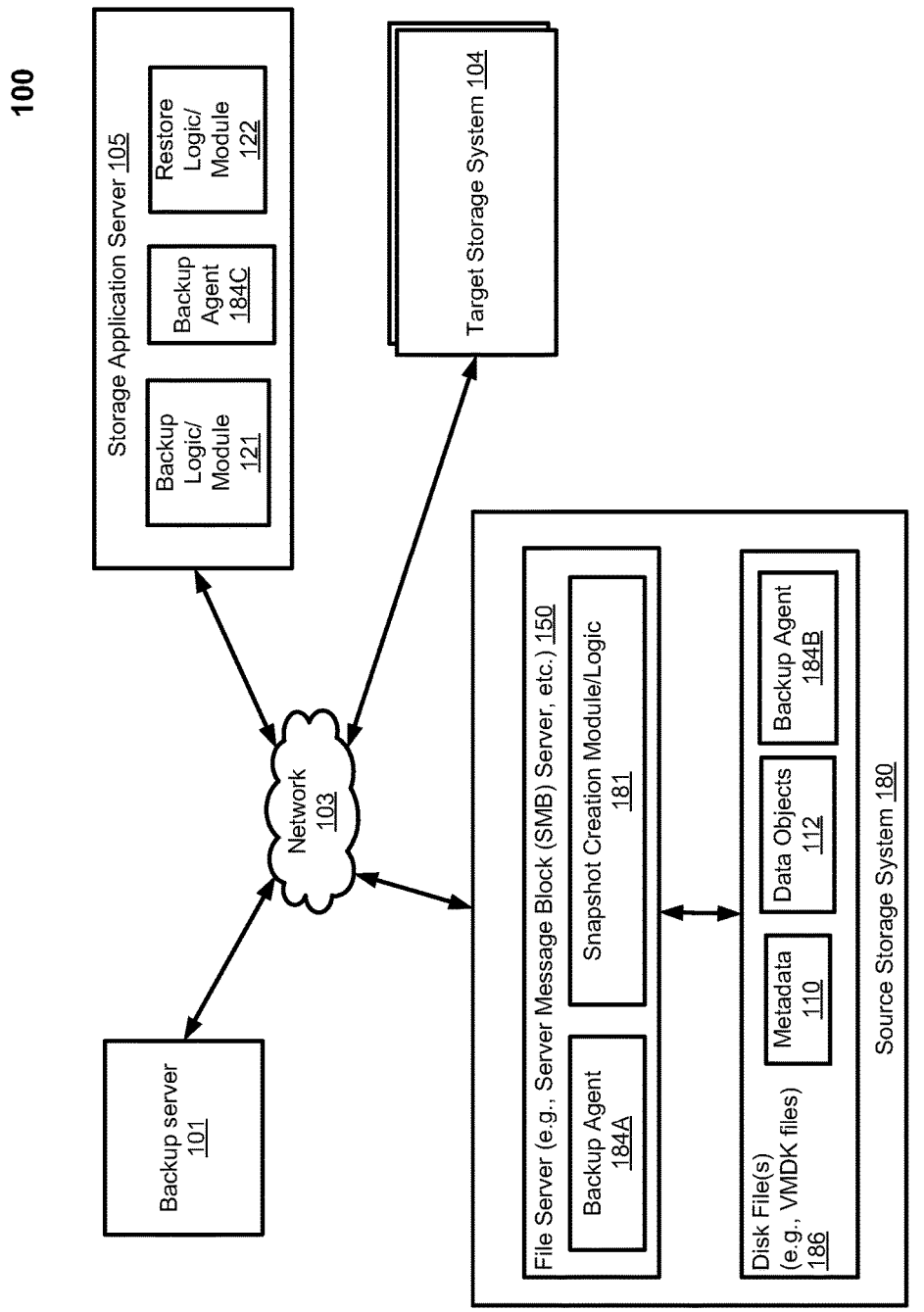
FIG. 1 is a block diagram illustrating a storage system according to at least one of the embodiments described herein.

Various embodiments and aspects of the embodiments set forth herein will be described with reference to details discussed below, and the accompanying drawings will illustrate the various embodiments. The following description and drawings are illustrative of the embodiments described herein and are not to be construed as limiting any of the embodiments described herein. Numerous specific details are described to provide a thorough understanding of various embodiments described herein. However, in certain instances, well-known or conventional details are not described in order to provide a concise discussion of the embodiments described herein.

Reference in the specification to "one embodiment," "an embodiment," "alternate embodiment," "another embodiment," and their respective variations means that a particular feature, structure, or characteristic described in connection with the embodiment can be included in at least one embodiment of the invention. The appearances of the phrases "in one embodiment," "in an embodiment," "in alternate embodiment," "in another embodiment," and their respective variations in various places in the specification do not necessarily refer to the same embodiment.

In the following description and claims, the terms "coupled" and "connected," along with their derivatives, may be used. It should be understood that these terms are not intended as synonyms for each other. "Coupled" and its variations are used to indicate that two or more devices or components, which may or may not be in direct physical or electrical contact with each other, co-operate or interact with each other. "Connected" and its variations are used to indicate the establishment of communication between two or more devices or components that are coupled with each other. For example, two devices that are connected to each other are communicatively coupled to each other. "Communication" and its variations includes at least one of transmitting or forwarding of information to a device or component or receiving of information by a device or component.

Embodiments described herein address backing up data in storage system using a backup workflow that includes a file server implementing a network file sharing protocol for the storage system. According to some embodiments, a file server implementing a network file sharing protocol is used in an improved backup workflow that can assist with improving performance and efficiency by reducing the data movements (number of hops) within a storage system, and/or by off-loading backup processing in the file server or another type of server (e.g., an application server) of the storage system.

According to an embodiment, a storage system includes a file server (e.g., a Server Message Block (SMB) server, etc.) communicating storage services to files stored in a plurality of storage devices via one or more file sharing protocols. In this embodiment, in response to a request to back up data that is received at the file server from an application server, the file server (which is part of a source storage system that includes a source storage device) creates a snapshot of the data to be backed up using the data stored in the source storage device. Furthermore, the file server sends the created snapshot from the source storage device to the target storage system for storage. Moreover, the file server sends a first notification to the application server indicating that the created snapshot has been backed up in the target storage system. In addition, the application server sends a second notification to a backup server indicating that the data has been backed up, where the backup server is configured to manage backup of a plurality of storage systems.

In a further embodiment, the files server sends metadata associated with the snapshot to the target storage system for storage of the metadata in the target storage system. In an even further embodiment, the files server sends, via the first notification, the metadata associated with the snapshot to the application server and the application server sends, via the second notification, the metadata to the backup server.

In one embodiment, the one or more file sharing protocols being implemented by the file server include at least one of a common internet file system (CIFS) protocol or a server message block (SMB) protocol. In one embodiment, the created snapshot (and/or its associated metadata) is transmitted to the target storage system by one or more processing units of the source storage device. In one embodiment, the storage devices hosted by the file server include a plurality of disks. In one embodiment, one or more processing units of the source storage device create the snapshot of the data to be backed up.

FIG. 1 is a block diagram illustrating storage system 100, in accordance with one of the embodiments described herein. System 100 includes backup server 101 coupled to source storage system 180, target storage system 104, and storage application server 105 over network 103. In one embodiment, backup server 101 is responsible for managing backup of a plurality of storage systems by directing the backing up and restoring of files, folders, databases, and hard drives over a network in order to prevent the loss of data in the event of a hard drive failure, user error, disaster, or accident. In one embodiment, backup server 101 manages backups by making requests to storage application server 105. For example, and in one embodiment, backup server 101 manages backups based on requests to backup data that are received from other clients being operated by users (e.g., a personal computer, etc.). In this example, backup server 101 processes the received requests and makes backup requests to storage application server 105. In this way, backup server 101 acts a system level client that makes requests to backup data on the backend. Alternatively, backup server 101 may be a primary storage system (e.g., local data center) that provides storage to one or more clients, which may periodically back up the content stored therein to a backup storage system (e.g., a disaster recovery site or system), such as target storage system 104. These one or more clients may be any type of client system that includes a server, a host, a personal computer (e.g., desktops, laptops, and tablets), a "thin" client, a personal digital assistant (PDA), a Web enabled appliance, or a mobile phone (e.g., Smartphone), etc. It is to be appreciated that there can be more than one client in storage system 100.

Network 103 may be any type of network, such as a local area network (LAN), a wide area network (WAN) such as the Internet, a fiber network, a storage network, or a combination thereof, wired or wireless. Backup server 101 may be in physical proximity or may be physically remote from client(s), source storage system 180, storage application server 105, or target storage system 104. Moreover, each of backup server 101, source storage system 180, storage application server 105, and target storage system 104 may be in physical proximity with each other or may be physically remote from each other.

Target storage system 104 may include any type of server or cluster of servers. For example, target storage system 104 may include a storage server used for at least one of a variety of different purposes—for example, to provide multiple users with access to shared data and/or to back up mission critical data. Target storage system 104 may include, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Target storage system 104 may have a distributed architecture, or all of its components may be integrated into a single unit. Target storage system 104 may be implemented as part of an archive and/or backup storage system such as a de-duplication storage system available from EMC® Corporation of Hopkinton, Mass. Additional details about target storage system 104 are described below in connection with at least one of FIGS. 3-8.

Source storage system 180 may include any type of server or cluster of servers, which may have the same or similar architecture as the architecture of target storage system 104. In one embodiment, system 180 includes file server 150 and disk file(s) 186. System 180 may include a storage device having an appliance used to provide NAS capability or a unified storage device (e.g., one which combines NAS and SAN capabilities, a near-line storage device, a DAS device, a tape backup device, or essentially any other type of data storage device. In one embodiment, file server 150 is an appliance with NAS capability that implements at least one file sharing protocol (e.g., CIFS, SMB, Samba, etc.). File server 150 can include one or more hard disk drives, often arranged into logical, redundant storage containers (RAID). Additional details about Source storage system 180 are described below in connection with at least one of FIGS. 3-8.

In one embodiment, file server 150 implements a file system (also known as "filesystem") that controls how data is stored and retrieved using the SMB protocol, a dialect of the SMB protocol (e.g., CIFS), or an adaptation of the SMB protocol (e.g., Samba). For the sake of brevity, the description in the paragraph will refer only to the SMB protocol. The SMB protocol provides access for file server 150 on network 103 for the data storage system 100. The SMB Protocol is a client-server implementation and consists of a set of data packets, each containing a request sent by the client or a response sent by the server. These packets can be broadly classified as follows: (i) session control packets for establishing and discontinuing a connection to shared server resources; (ii) file access packets for accessing and manipulating files and directories on a remote server; and (iii) general message packets for sending data to print queues, mailslots, and named pipes, and providing data about the status of print queues. These packets can be used can enable an application (or the user of an application) to access files or other resources at a remote server. This allows applications to read, create, and update files on the remote server. It can also communicate with any server program that is set up to receive an SMB client request.

In one embodiment, file server 150 includes backup agent 184A, which provides an improved backup workflow for the one or more file sharing protocols being implemented by file server 150. In one embodiment, the one or more file sharing protocols include at least one of SMB, CIFS, or Samba. File server 150, in one embodiment, also includes snapshot creation module/logic 181 for creating a snapshot of data to be backed up. The snapshot records information of the data at a point in time. It may be a snapshot of the entire file system, or a snapshot of one or more individual files. The snapshot may include information such as data segment references, content handles, etc.

Source storage system 180 also includes one or more disk file(s) 186, which include the data to be backed up to target storage system 104. In one embodiment, the data to be backed up includes metadata 110 and data objects 112. Disk file(s) 186 can be virtual machine (VM) disk file(s) that are the content files of one or more VMs. A virtual machine (VM) represents a completely isolated operating environment with a dedicated set of virtual resources associated with it. A virtual machine may be installed or launched as a guest operating system (OS) hosted by a host OS or a hypervisor. Typically, a host OS or hypervisor represents a virtual machine monitor (VMM) for managing the hosted virtual machines. A virtual machine can be any type of virtual machine, such as, for example, hardware emulation, full virtualization, para-virtualization, and operating system-level virtualization virtual machines. Different virtual machines hosted by a server (e.g., file server 150, storage application server 105) or a storage system (e.g., source storage system 180, target storage system 104) may have the same or different privilege levels for accessing different resources of the server or storage system. Disk file(s) 186 can also include backup agent 184B, which coordinates with backup agent 184A to provide an improved backup workflow for the one or more file sharing protocols being implemented by file server 150.

Source storage system 180 may have a distributed architecture, or all of its components may be integrated into a single unit. Source storage system 180 may be implemented as part of an archive and/or backup system, or a disaster recovery system, such as a deduplicating storage system available from EMC® Corporation of Hopkinton, Mass. In one embodiment, source storage system 180 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment described herein. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system. Again, the architecture of source storage system 180 and target storage system 104 may be identical or similar. The description provided in connection with source storage system 180 may be applied to target storage system 104, or vice versa.

Storage application server 105 can coordinate with target storage system 104, source storage system 180, and backup server 101 to run various backup operations. Storage application server 105 handles all application operations between backup server 101 (e.g., a backup server) and the backend of the storage system 100—i.e., source storage system 180 and target storage system 104. Storage application server 105 includes any storage service related components configured or adapted to provide storage services (e.g., storage as a service) to a variety of backup servers 101 using any access protocols as is known in the art. For example, storage application server 105 may include backup logic/module 121 and restore logic/module 122. Backup logic/module 121 is configured to receive requests to back up data from a backup server 101 and to report to the backup server 101 the successful or unsuccessful backing up of data from source storage system 180 to target storage system 104. Restore logic 122 is configured to retrieve and restore backup data from target storage system 104 back to source storage system 180 and to report the successful or unsuccessful restoration of the backed up data to backup server 101. Storage application server 105 also includes backup agent 184C, which works with at least one of backup agent 184A-B to provide an improved backup workflow for one or more file sharing protocols (e.g., SMB, CIFS, Samba, etc.) being implemented by file server 150. In one embodiment, application server 105 may be integrated with backup server 101 as a single server or cluster of servers.

In one embodiment of system 100, the backup logic/module 121 is configured to receive requests to back up data from backup server 101 and to report the successful or unsuccessful storage of the backed up data to target storage system 104. In one embodiment, a user (e.g., an administrator) initiates a backup request, directly or through a backup schedule, within backup server 101. Backup server 101 directs the request to the backup logic/module 121, which in turn provides the request to backup agent 184C.

As shown in FIG. 1, the to-be-backed-up data (e.g., data objects 112 and metadata 110) resides at source storage system 180, which includes file server 150 that is implementing a network file sharing protocol such as, but not limited to, the SMB protocol. Backup agent 184A receives the request from backup agent 184C and directs snapshot creation module/logic 181 to create a snapshot of to-be-backed-up data. In response to the snapshot being created, file server 150 provides the snapshot to target storage system 104 for storage.

In one embodiment, when the backup is successfully completed, file server 150 provides a first notification to backup agent 184C of the application server 105, which in turn provides a second notification to backup server 101. In an alternate embodiment, when the backup is unsuccessful, each of the notifications (i.e., the first notification provided by file server 150 and the second notification provided by storage application server 150) indicates that the backup was unsuccessful. In one embodiment, each of the notifications sent by file server 150 and the application server 105 includes metadata and/or application data associated with the backup.

In another embodiment of system 100, a user (e.g., an administrator) initiates a backup request, directly or through a backup schedule, within backup server 101. Backup server 101 directs the request to the backup logic/module 121, which in turn provides the request to backup agent 184C. In this embodiment, backup agent 184C sends the snapshot creation request (shadow copy creation request) to file server 150. Furthermore, file server 150, via snapshot creation logic/module 181, directs this request to disk file(s) 186 so that the snapshot (or shadow copy) of the data to be backed up is created using disk file(s) 186. In one embodiment, the snapshot is created by backup agent 184B within disk file(s)

186 from at least one of metadata 110 or data objects 112. In this embodiment, the created snapshot is sent directly from disk file(s) 186 to target storage system 104 over network 103. Once the data has been backed up to target storage system 104, file server 150 notifies the same to storage application server 105, which in turn notifies backup server 101. In one embodiment, each of the notifications sent by file server 150 and the application server 105 includes metadata and/or application data associated with the backup.

The improved backup workflow resulting from the modification, by at least one of backup agents 184A-C, of the file sharing protocol implemented by system 100 can provide several advantages. One advantage can be assisting with facilitating an improved performance of the components in system 100 and facilitating improved efficiency by reducing the data movements (number of hops) between the components of system 100. Another advantage can be assisting with facilitating a reduction of the backup processing performed by application server 105. Yet another advantage can be assisting with facilitating a reduction of the backup processing performed by file server 150.

Note that some or all of the components as shown and described above (e.g., storage service application server 105, each of backup agents 184A-C, and/or snapshot creation module/logic 181 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 2:
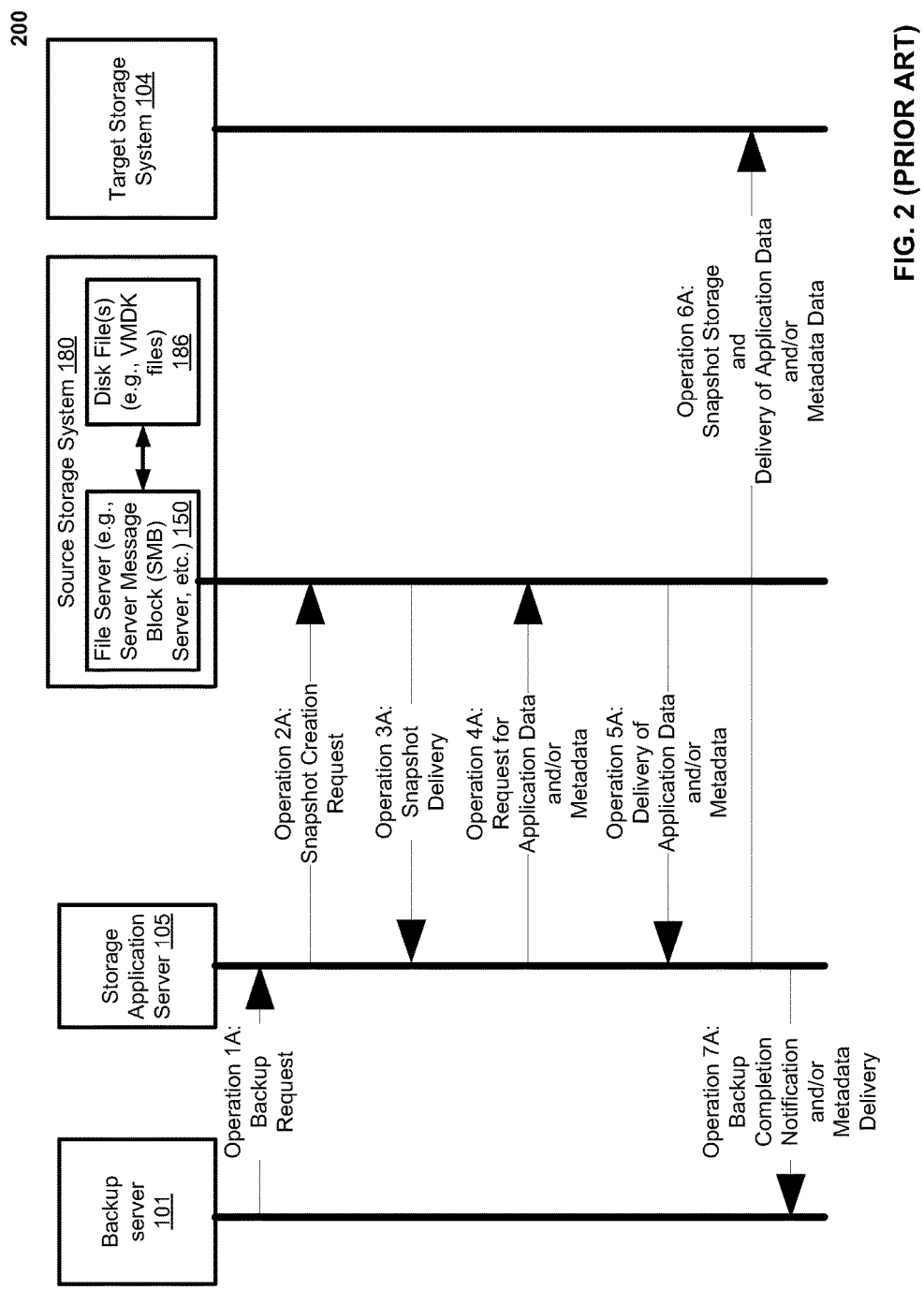
FIG. 2 is a transactional diagram illustrating a conventional backup process.

FIG. 2 is a transactional diagram illustrating a conventional backup process 200. It is beneficial to describe this conventional backup process 200 so as to show how the improved backup workflows described above in connection with FIG. 1 and described below in connection with FIG. 3-7 improve at least one currently-available backup workflow.

The conventional backup process 200 begins with operation 1A, which involves backup server 101 transmitting a backup request to storage application server 105. In response to receiving the backup request, process 200 performs operation 2A, which involves storage application server 105 sending a snapshot creation request to source storage system 180. More specifically, file server 150 of source storage system 180 receives the snapshot creation request and in response, file server 150 creates the snapshot.

Process 200 proceeds to operation 3A, which involves file server 150 communicating the created snapshot back to storage application server 105. In response to receiving the created snapshot, at operation 4A, the application server 105 sends a request to file server 150 to read application data and/or metadata associated with the snapshot. Process 200 proceeds to operation 5A, where file server 150 sends the application data and/or metadata to the application server 105. Subsequently, process 200 proceeds to operation 6A, which involves the application server 105 writing the received snapshot with the application data and/or metadata to target storage system 104. After completing the backup, storage application server 105, at operation 7A, communicates the application data and/or metadata with a backup completion notification to backup server 101 to indicate that the backup was successful.

As shown in FIG. 2, process 200 includes at least seven different operations, most of which are performed by storage application server 105 and file server 150. In contrast, the embodiments of the improved backup workflows set forth in FIGS. 1 and 3-7 include less than seven operations (e.g., five or less different operations). Moreover, these embodiments can assist with providing several improvements, as described above in connection with FIG. 1.

Figure 3:
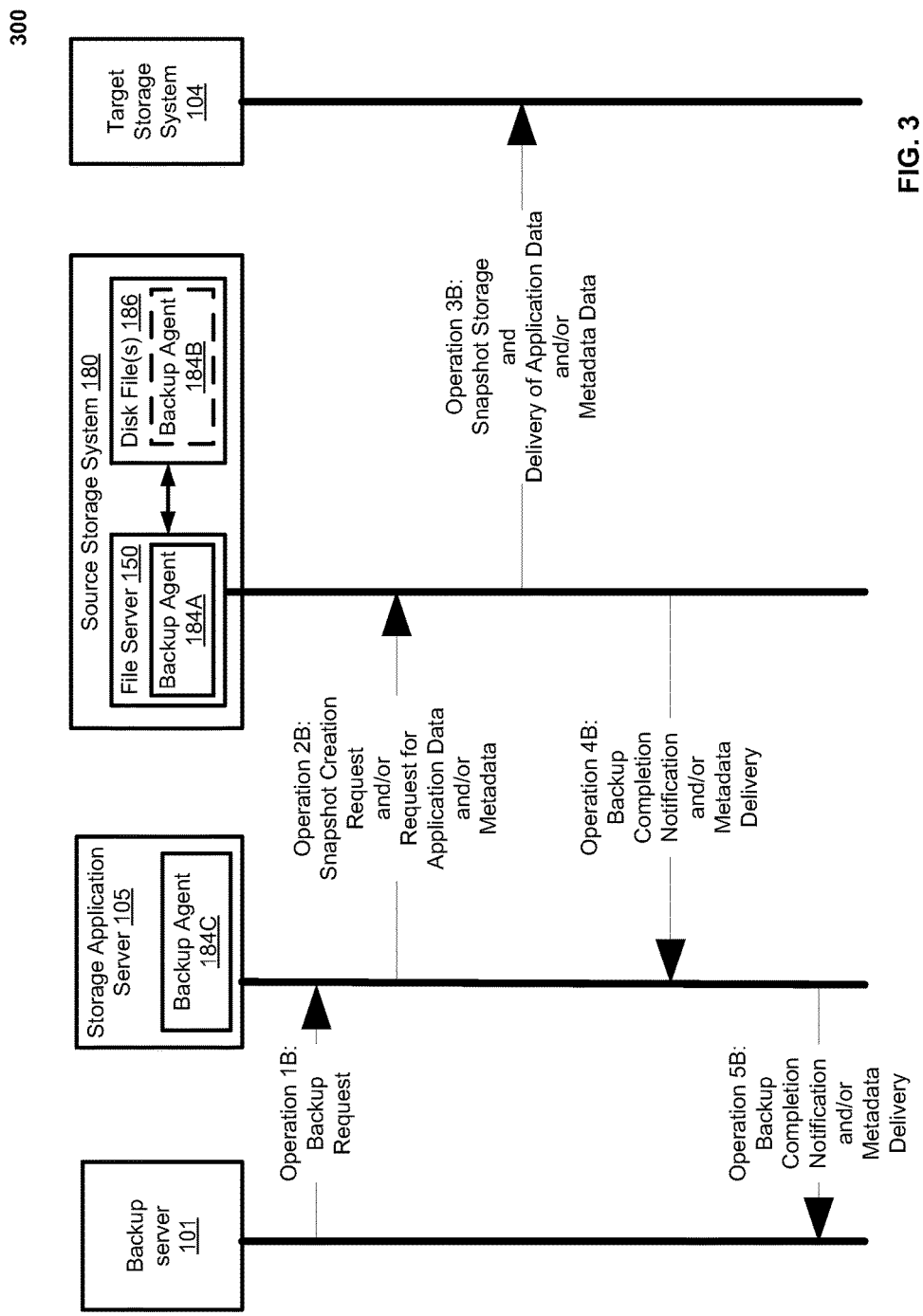
FIG. 3 is a transactional diagram illustrating a backup process according to one of the embodiments described herein.

FIG. 3 is a transactional diagram illustrating a backup process 300 according to one of the embodiments described herein. Backup process 300 is performed by a storage system, such as system 100 that includes at least one of backup agents 184A-C.

Backup process 300 is one embodiment of a process that can assist with improving the currently available backup process 200, which is described above. In one embodiment, process 300 begins with operation 1B, which involves backup server 101 transmitting a backup request to storage application server 105. In one embodiment, and in response to storage application server 105 receiving the backup request, process 300 proceeds to operation 2B. In this embodiment, operation 2B involves storage application server 105 sending, to source storage system 180, at least one of the following: (i) a request to create a snapshot of the data to be backed up (hereinafter "snapshot creation request"); (ii) a request for application data associated with data to be backed up (hereinafter "application data request"), or a request for metadata associated with the data to be backed up (hereinafter "metadata request"). In one embodiment, backup agent 184C performs operation 2B.

Operation 2B can enable all requests for data required by storage application server 105 to be sent at once. This can assist with facilitating the improvements described above in connection with FIG. 1. In one embodiment, file server 150 of source storage system 180 receives the snapshot creation request, the application data request, and/or the metadata request and in response, file server 150 creates the snapshot. The snapshot can be created based on data stored in disk file(s) 186. In one embodiment, disk file(s) 186 can optionally include backup agent 184B to assist with the creation of the snapshot in accordance with the requirements of process 300. Additional details about backup agent 184B are described below in connection with FIG. 4.

Process 300 proceeds to operation 3B, which involves backup agent 184A of file server 150 communicating the created snapshot to target storage system 104 for storage. In a further embodiment, backup agent 184A also forwards the application data and/or metadata associated with the snapshot to target storage system 104 for storage. In this way, operation 3B can assist facilitating the improvements described above in connection with FIG. 1.

After the snapshot, the application data associated with the snapshot, and/or the metadata associated with the snapshot have been stored in target storage system 104, file server 150 can communicate a backup completion notification, the application data associated with the snapshot, and/or the metadata associated with the snapshot to storage application server 105. In one embodiment, and at operation 4B, backup agent 184A communicates the backup completion notification, the application data associated with the snapshot, and/or the metadata associated with the snapshot to storage application server 105. The backup completion notification can be any messaging format used to communicate between servers regarding the status of an operation (e.g., a packet, etc.). Process 300 proceeds to operation 5B, which includes storage application server 105 communicating the backup completion notification, the application data associated with the snapshot, and/or the metadata associated with the snapshot to backup server 101.

Process 300 shows that the number of operations used to perform backups in a data storage system that includes a file server implementing a network file sharing protocol (e.g., the SMB protocol) can be reduced to less than seven (7) different operations. In this way, process 300 can assist with realizing the advantages described above in connection with FIG. 1.

Figure 4:
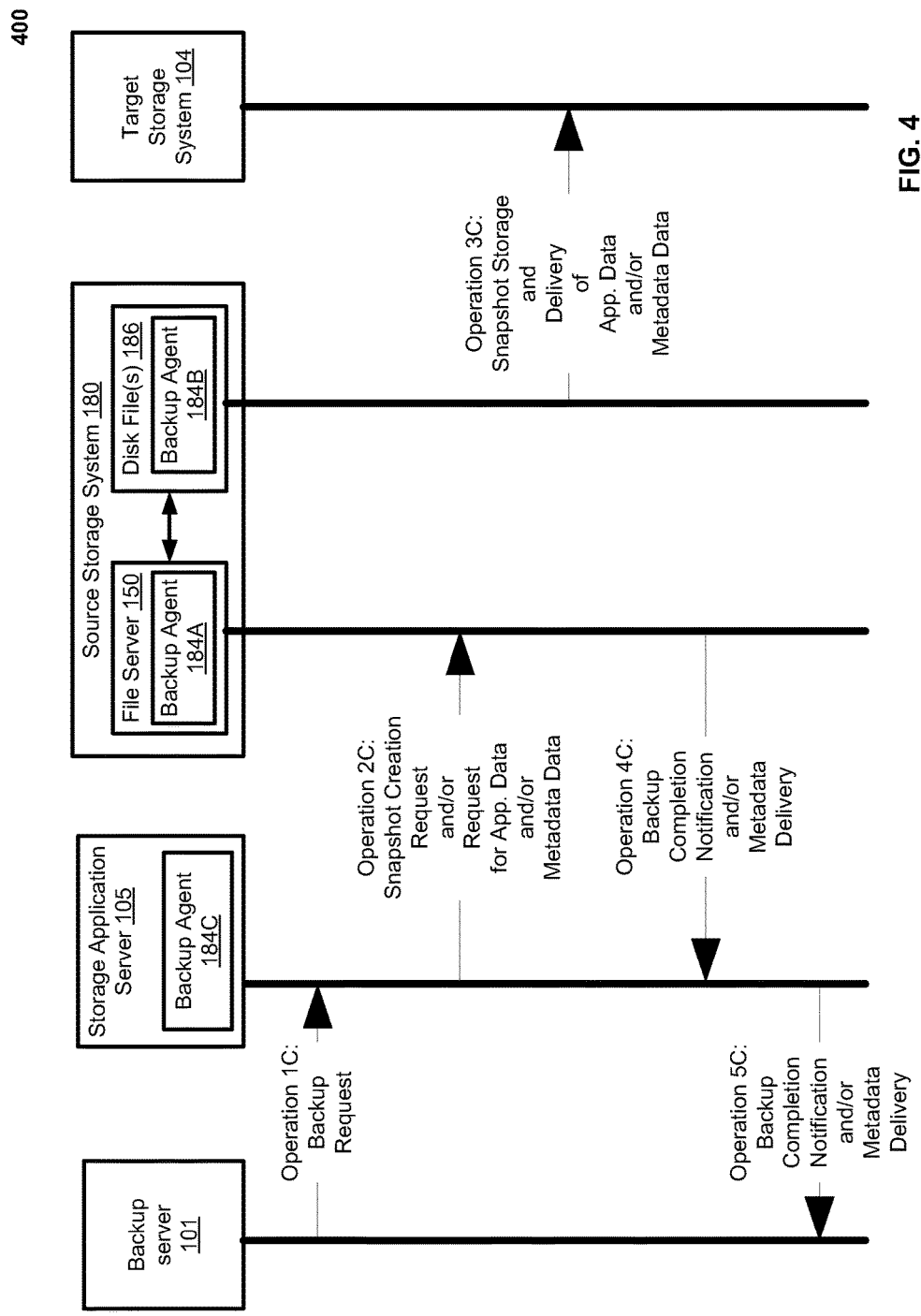
FIG. 4 is a transactional diagram illustrating a backup process according to another one of the embodiments described herein.

FIG. 4 is a transactional diagram illustrating a backup process 400 according to another one of the embodiments described herein. Backup process 400 is performed by a data storage system, such as system 100 that includes at least one of backup agents 184A-C.

Backup process 400 is one embodiment of a process that can assist with improving the currently available backup process 200 described above. In one embodiment, process 400 begins with operation 1C, which is similar to or the same as operation 1B that is described above in connection with FIG. 3.

In one embodiment, and in response to storage application server 105 receiving the backup request, the next operation of process 400 is operation 2C. Operation 2C is similar to or the same the operation 2B, as described above in connection with FIG. 3.

In response to file server 150 of source storage system 180 receiving the snapshot creation request, the application data request, and/or the metadata request, file server 150 communicates the received request(s) to disk file(s) 186. In one embodiment, file server 150 and the disk files 186 communicate with each other via internal communication pathway(s) or (also referred to as "data path(s)") of source storage system 180. Additional details about these internal communication pathway(s) are described below in connection with FIG. 7.

In one embodiment, disk file(s) 186 include backup agent 184B to assist with the creation of the snapshot in accordance with the requirements of process 400. In response to receiving the communicated request(s), backup agent 184B can create the snapshot. For example, and in one embodiment, backup agent 184B creates the snapshot from data stored in disk file(s) 186. Process 400 proceeds to operation 3C, which involves backup agent 184B communicating the created snapshot to target storage system 104 for storage. In a further embodiment, backup agent 184B also forwards the application data associated with the snapshot and/or the metadata associated with the snapshot to target storage system 104 for storage. In this way, operation 3C can assist facilitating the improvements described above in connection with FIG. 1.

After the snapshot, the application data associated with the snapshot, and/or the metadata associated with the snapshot have been stored in target storage system 104, backup agent 184B communicates information about the completion of the backup, the application data associated with the snapshot, and/or the metadata associated with the snapshot to file server 150. In one embodiment, backup agent 184B and file server 150 communicate using one or more internal communication pathways of source storage system 180, as described below in connection with FIG. 7. In one embodiment, process 400 proceeds to operation 4C, which includes file server 150 communicating the backup completion notification and/or metadata associated with the snapshot to storage application server 105. In one embodiment, backup agent 184A of file server 150 performs operation 4C. At operation 5C, storage application server 105 communicates the backup completion notification, the application data associated with the snapshot, and/or the metadata associated with the snapshot to backup server 101. In one embodiment, backup agent 184A performs operation 5C.

Process 400 can assist with reducing the number of operations used to backup data in storage server system that includes a file server implementing a network file sharing protocol (e.g., the SMB protocol). In this way, process 400 can assist with realizing the advantages described above in connection with FIG. 1.

Figure 5:
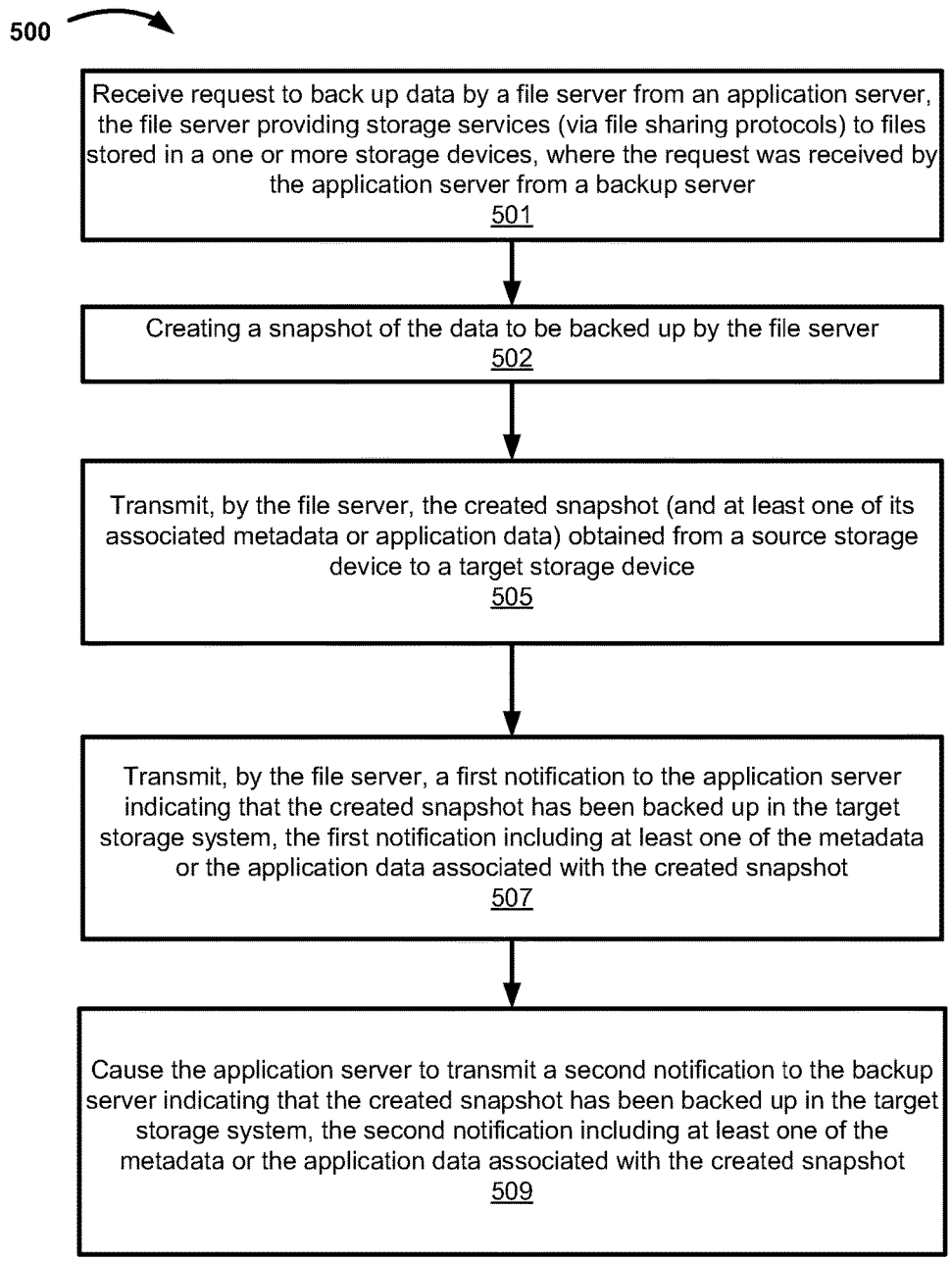
FIG. 5 is a flow diagram illustrating a process of backing up data according to one of the embodiments described herein.

FIG. 5 is a flow diagram illustrating a process 500 of backing up data according to one of the embodiments described herein. Process 500 is performed by a storage system, such as system 100 that includes at least one of backup agents 184A-C. In one embodiment, process 500 is performed by at least one of hardware, software, or a combination of both, as described above in connection with at least one of FIG. 1, 3, or 4. In a particular embodiment, process 500 may be performed by a file server (e.g., file server 150, which is described in connection with at least one of FIG. 1, 3, or 4).

Process 500 begins at block 501, where a request to back up data is received by a file server that provides storage services (via file sharing protocols) to files stored in a one or more storage devices. In one embodiment, an application server that is in communication with the file server transmits the request to the file server, as described above in connection with at least one of FIG. 1, 3, or 4. Furthermore, and in one embodiment, the application server transmits the request to the file server based on another request received by the application server from a backup server. At block 502, process 500 includes creating a snapshot of the data to be backed up by the file server. In one embodiment, the creation of a snapshot is performed as described above in connection with at least one of FIG. 1, 3, or 4.

Process 500, at block 505, includes transmitting the created snapshot (and at least one of its associated metadata or application data) to a target storage device. In an embodiment, the created snapshot is communicated from a source storage device, as described above in connection with at least one of FIG. 1, 3, or 4. The file server, which is in communication with both the source and target storage devices, can perform Block 505. In one embodiment, the created snapshot is communicated to the target device, as described above in connection with at least one of FIG. 1, 3, or 4.

At block 507 of process 500, the file server transmits a first notification to the application server indicating that the created snapshot has been backed up in the target storage system. In one embodiment, the first notification includes the metadata associated with the snapshot and/or the application data associated with the snapshot. In one embodiment, the first notification is communicated from the file server to the application server, as described above in connection with at least one of FIG. 1, 3, or 4.

In one embodiment, and at block 509 of process 500, a backup agent (e.g., backup agent 184C, as described in FIG. 1, 3, or 4) of the application server causes the application server to transmit a second notification to the backup server indicating that the created snapshot has been backed up in the target storage system. In one embodiment, the second notification includes the metadata associated with the snapshot and/or the application data associated with the snapshot.

Figure 6:
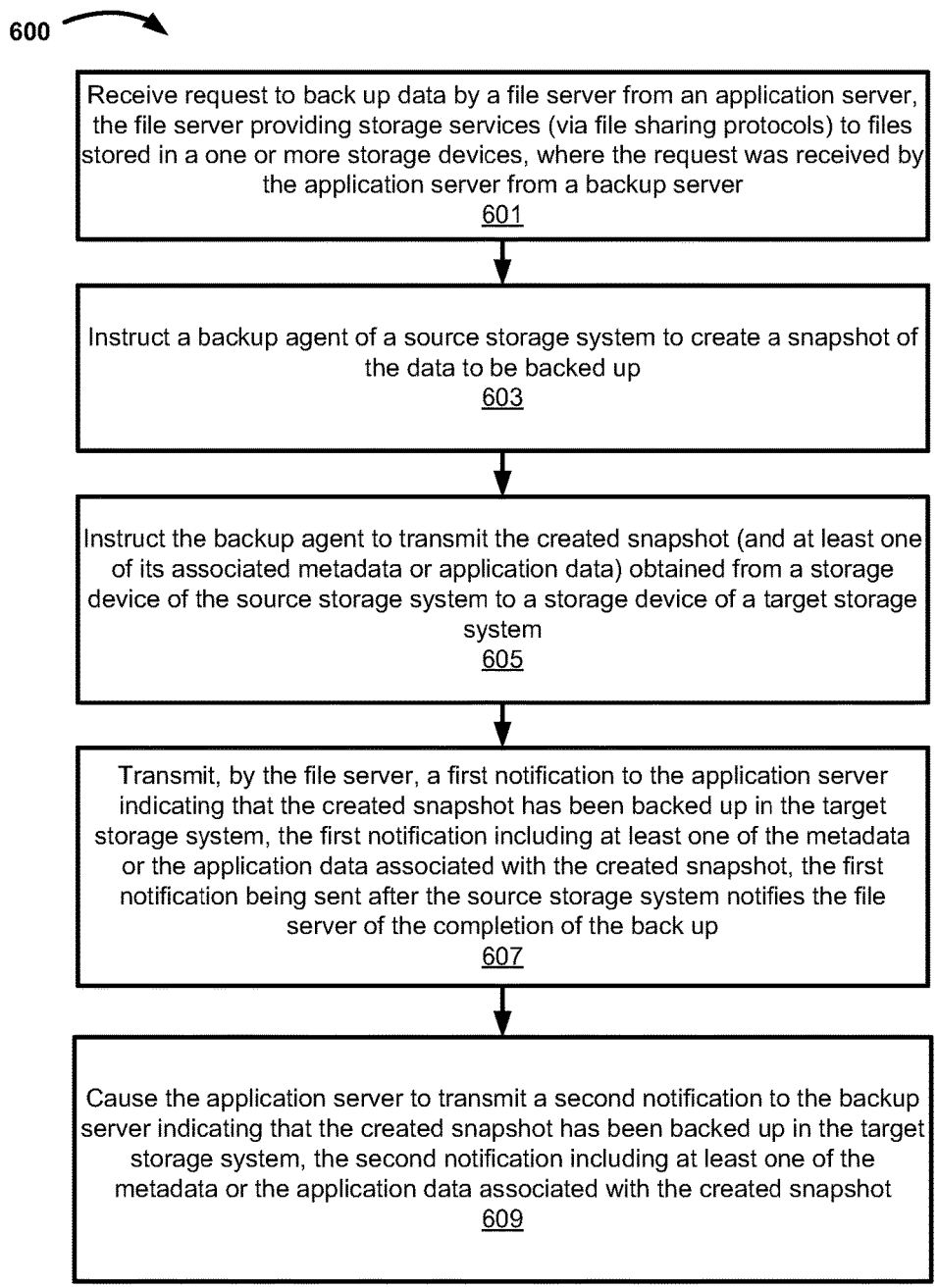
FIG. 6 is a flow diagram illustrating a process of backing up data according to another one of the embodiments described herein.

FIG. 6 is a flow diagram illustrating a process 600 of backing up data according to another one of the embodiments described herein. Process 600 is performed by a storage system, such as system 100 that includes at least one of backup agents 184A-C. In one embodiment, process 600 is performed by at least one of hardware, software, or a combination of both, as described above in connection with at least one of FIG. 1, 3, or 4.

Process 600 begins at block 601, where a request to back up data is received by a file server that provides storage services (via file sharing protocols) to files stored in a one or more storage devices. Block 601 is similar to or the same as block 501 of FIG. 5, as described above. At block 603, process 600 creates a snapshot of the data to be backed up. In one embodiment, the snapshot is created by a backup agent of a source storage system that is in communication with the file server in response to the source storage receiving the backup request from the file server. In one embodiment, the creation of a snapshot is performed as described above in connection with at least one of FIG. 1, 3, or 4.

Process 600, at block 605, includes transmitting the created snapshot (and at least one of its associated metadata or application data) to a target storage device. The source storage system is in communication with the target storage system. In an embodiment, the created snapshot is communicated by the source storage system from a storage device of the source storage system to a storage device of a target storage system 4. For example, the backup agent of a source storage system transmits the created snapshot to the target storage system. In one embodiment, the created snapshot is communicated to the storage device of the target storage system, as described above in connection with at least one of FIG. 1, 3, or 4.

At block 607 of process 600, the file server transmits a first notification to the application server indicating that the created snapshot has been backed up in the target storage system. In one embodiment, the first notification is transmitted by the file server in response to the file server being notified of the completion of the back up by the source storage system. The first notification can include metadata associated with the snapshot and/or application data associated with the snapshot. Moreover, the first notification can be communicated from the file server to the application server, as described above in connection with at least one of FIG. 1, 3, or 4.

In one embodiment, and at block 609 of process 600, a backup agent (e.g., backup agent 184C, as described in FIG. 1, 3, or 4) of the application server causes the application server to transmit a second notification to the backup server indicating that the created snapshot has been backed up in the target storage system. The second notification includes the metadata associated with the snapshot and/or the application data associated with the snapshot.

Figure 7:
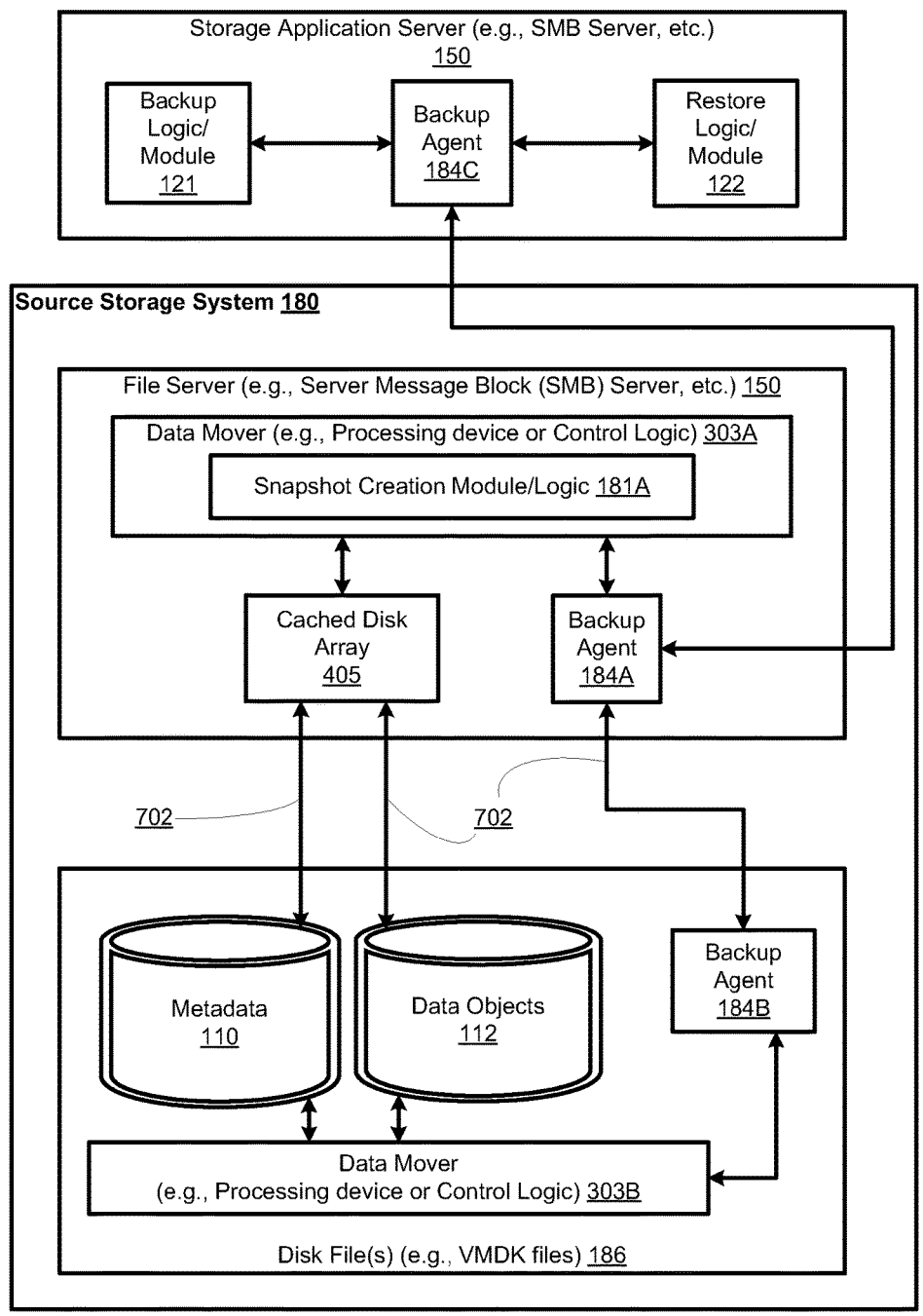
FIG. 7 is a block diagram illustrating a process of backing up data according to another one of the embodiments described herein.

FIG. 7 is a block diagram illustrating a process of backing up data according to another one of the embodiments described herein. FIG. 7 provides additional details about the storage application server 150 and source storage system 180 (which includes file server 150 and disk file(s) 186) that are described above in connection with at least one of FIG. 1, 3, 4, 5, or 6. For the sake of brevity, only the storage application server 150, source storage system 180, file server 150, and disk file(s) 186 are described.

In one embodiment, backup agent 184A, 184B, and 184C reside inside the storage application server 150, file server 150, and disk file(s) 186, respectively. It is to be appreciated that there may be multiple backup agents 184A-C. In some embodiments, each of the backup agents 184A-C can be a plug in for a backup application or an application.

The backup logic/module 121 of the storage application server 150 can receive a request to backup data from a backup server (e.g., backup server 101 of FIG. 1). The received request is communicated from the backup logic/module 121 to backup agent 184C. The request is then processed by backup agent 184C and communicated to file server 150. In one embodiment, the request is communicated based on a file networking protocol (e.g., the Server Message Block (SMB) networking protocol, the Common Internet File System (CIFS) networking protocol, or other similar networking protocols). Backup agent 184A processes the request in order to backup the specified data. In one embodiment, backup agent 184A communicates with a data mover 303A, which can be implemented as hardware, software, or a combination of both (as described above in FIG. 1). The data mover 303A receives the request to backup data and determines whether the specified data resides in a file system (not shown) that is associated with the data mover 303A. The file system associated with the data mover 303A resides in the cached disk array 405. If the data mover 303A can locate the specified data within the cached disk array 405, then snapshot creation module/logic 181A creates a snapshot of the specified data. In one embodiment, the creation of the snapshot includes creating a snapshot of the metadata associated with the specified data and/or the application data associated with the specified data.

If the data mover 303A (e.g., backup, replication, migration, etc.) determines that the specified data does not reside in the disk array 405, then the data mover 303A communicates this situation to backup agent 184A. In response to this information, backup agent 184A communicates with disk file(s) 186 to determine whether the specified data is stored within disk file(s) 186. In one embodiment, the backup agent 184 communicates a request to backup agent 184B to back up the specified data from disk file(s) 186.

In one embodiment, file server 150 and the disk files 186 communicate with each other via internal communication pathway(s) 702 (e.g., bus, network, etc.) of source storage system 180. The architecture of source storage system 180 can include local data paths 702 reserved for the devices that are part of system 180. In practice, local data paths 702 can be paths that are internal to and inherent in source storage system 180. For example, and in one embodiment, cached disk array 405 of file server 150 communicates with disk file(s) 186 via these inherent data paths 702. In one embodiment, the inherent data paths 702 of system 180 can enable access to file system(s) residing in file server 150 and file system(s) residing in a storage appliance associated with disk file(s) 186 in a way that makes these seemingly disjointed file systems appear as a single file system (e.g., a logical file system, etc.). In one embodiment, backup agents A-C can enable the inherent data paths of system 180 by programming the configurations of file server 150 and disk file(s) 186 to permit the file system(s) of the file server 150 to be accessed by the file system(s) of the disk file(s) 186 and vice versa.

Backup agent 184B communicates the request to back up the specified data to data mover 303B, which in turn determines whether the specified data is included in data objects 112 and/or metadata 110. In one embodiment, if the specified data is included in data objects 112 and/or metadata 110, backup agent 184B causes the data mover 303B to copy the specified data to the file system of the cached disk array 405. Once the specified data is copied to the file system of the cached disk array 405, backup agent 184B communicates completion of copying to backup agent 184A. In one embodiment, backup agent 184A causes the snapshot creation module 181A to create a snapshot of the specified data.

After the snapshot creation module 181A creates the snapshot, backup agent 184A communicates the snapshot, the application data associated with the snapshot, and/or the metadata associated with the snapshot to a target storage device (e.g., a storage device of the target storage system described above in connection with FIG. 1, 3, 4, 5, 6, or 7).

In an embodiment, the data mover 303B can include its own snapshot creation module (not shown) that is similar to or the same as the snapshot creation module 181A. In this embodiment, when the data mover 303B determines that the specified data is included in data objects 112 and/or metadata 110, then the data mover 303B creates the snapshot. Furthermore, and in one embodiment, backup agent 184B communicates the snapshot created by the data mover 303B to a target storage device (e.g., a storage device of the target storage system described above in connection with FIG. 1, 3, 4, 5, 6, or 7).

Figure 8:
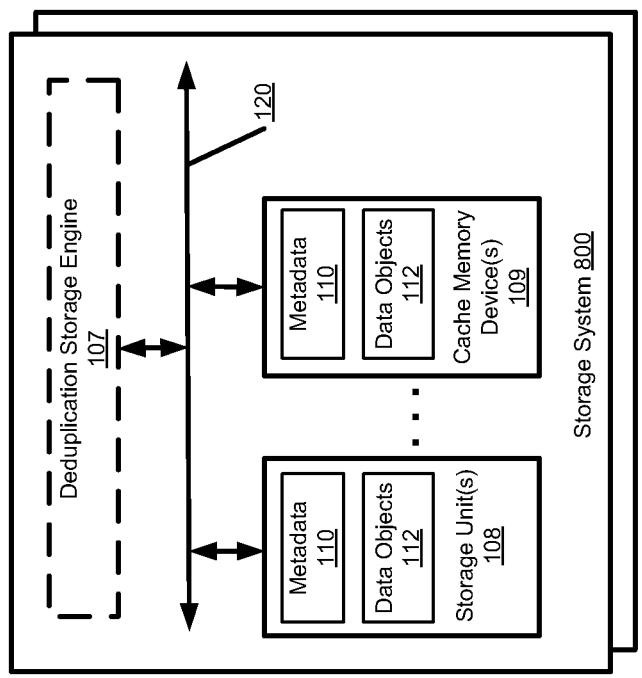
FIG. 8 is a block diagram of a storage system illustrating additional details about at least one of the target storage system or the source storage system set forth in FIG. 1 in accordance with one of the embodiments described herein.

FIG. 8 is a block diagram illustrating a storage system 800 that may represent at least one of target storage system 104 or source storage system 180, both of which are set forth in FIG. 1 in accordance with one of the embodiments described herein. The components of system 800 described in connection with FIG. 8 can be included in at least one of target storage system 104 or source storage system 180.

Storage system 800 may include or represent any type of server or a cluster of one or more servers (e.g., cloud servers). For example, storage system 800 may be a storage server used for various different purposes, such as to provide multiple users or client systems with access to shared data and/or to back up (or restore) data (e.g., mission critical data). Storage system 800 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 800 may further provide storage services via an object-based protocol and Hadoop distributed file system (HDFS) protocol.

In one embodiment, storage system 800 includes at least one of deduplication logic 107, one or more storage units or devices 108, or one or more cache memory devices 109 (also referred to as cache or cache devices). In one embodiment, each of deduplication logic 107, storage unit(s) 108, and cache device(s) 109 may be implemented in software, hardware, or a combination thereof. In one embodiment, at least two of deduplication logic 107, storage unit(s) 108, or cache device(s) 109 is communicatively coupled to each other.

In one embodiment, storage unit(s) 108-109 or cache device(s) 114 may be implemented locally (e.g., single node operating environment) or remotely (e.g., multi-node operating environment) via interconnect 120, which may be a bus and/or a network (e.g., a storage network or a network similar to network 103). Storage unit(s) 108-109 may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

Storage units 108 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108 may also be combinations of such devices. In the case of disk storage media, the storage units 108 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding; a reference to a segment plus a difference; etc.). In one embodiment, different storage units may use different compression methods (e.g., main or active storage unit from other storage units, one storage unit from another storage unit, etc.).

In one embodiment, cache device(s) 114 include at least one of a volatile memory device or a non-volatile memory device. For example, and in one embodiment, cache device(s) 114 can be a non-volatile memory device such as a solid state drive (SSD), a flash memory device, a flash-based memory device, a peripheral component interconnect express (PCIe) connected flash memory, solid state device (SSD), magnetic tape, magneto-optical (MO) storage media, or other known non-volatile memory device that is known to be used as a cache memory device.

The metadata, such as metadata 110, may be stored in at least some of storage units 108 or cache devices 109, such that files can be accessed independent of another storage unit. Metadata of each storage unit includes enough information to provide access to the files it contains. In one embodiment, metadata may include fingerprints or representatives contained within data objects 112, where a data object may represent a data segment (also referred to as a data chunk), a compression region (CR) of one or more data segments, or a container of one or more CRs. Fingerprints are mapped to a particular data object via metadata 110, enabling the system to identify the location of the data object containing a data segment represented by a particular fingerprint. A fingerprint may be generated based on at least a portion of a data segment, for example, by applying a predetermined mathematical algorithm (e.g., hash function) to at least a portion of the content of the data segment. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 110 may include a file name, a storage unit identifier (ID) identifying a storage unit in which the segments associated with the file name are stored, reconstruction information for the file using the segments, and any other appropriate metadata information. Metadata 110 may further include a segment ID, a segment sketch, a hash of a segment, an encrypted hash of a segment, random data, or any other appropriate metadata. In some embodiments, metadata associated with a segment is used to identify identical and/or similar data segments. The stored metadata enables a faster identification of identical and/or similar data segments as an ID and/or sketch (e.g., a set of values characterizing the segment) do not need to be recomputed for the evaluation of a given incoming data segment.

In one embodiment, a segment ID includes one or more deterministic functions of a data segment (also referred to as a data segment), one or more hash functions of a data segment, random data, or any other appropriate data segment ID. In various embodiments, a data segment sketch includes one or more deterministic functions of a data segment, one or more hash functions of a data segment, one or more functions that return the same or similar value for the same or similar data segments (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a segment. For example, a sketch may be generated by applying one or more functions (e.g., hash functions) on a segment and a subset of the results of the functions performed on the segment (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, deduplication logic 107 is configured to process or segment files stored in storage system 800 into multiple data segments (also referred to as data chunks, segmented chunks, or chunks) according to a variety of segmentation policies or rules. In one embodiment, each file is processed by the deduplication logic 107 into multiple data segments. In one embodiment, the deduplication logic 107 breaks a file into variable-length data segments or fixed-length data segments based on a variety of rules or considerations. For example, and in one embodiment, the file is broken into multiple data segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, the metadata information 110 includes a file name, a fingerprint (or deduplication key) associated with segments of a file, an identification of a storage unit or cache device where the segments associated with the file name are stored or cached, reconstruction information for the file using the segments, and any other appropriate metadata information. In one embodiment, a main set of metadata information 110 can be reconstructed by using information of all storage units or caches associated with the storage system in the event that the main metadata is lost, corrupted, damaged, etc. Metadata 110 residing in storage unit(s) 108 or cache device(s) 109 can be reconstructed using metadata information 110 stored on a main storage unit 108 or other storage unit or units (e.g., replica storage unit). Metadata information 110 further includes index information (e.g., location information or fingerprints of data segments). In one embodiment, metadata information 110 includes prime segment information that can be used to provide a consistent point of a file system and/or reconstruct a file system in the event of file system failure.

Data deduplication is a process by which a data storage system (e.g., storage system 800) can detect multiple identical copies of data and only keep a single copy of that data, thus eliminating the redundant data by removing other copies of that data and thus improving storage utilization. In at least some systems, data deduplication requires iterating over set of data blocks in one or more storage extents, finding the blocks that contain identical information by processing digest information associated with each block and mapping the identical blocks to a single copy of the data. In such systems, an index table (not shown) of unique digests is created to find commonality among the data set. When a deduplicated data block is updated with a new content, a new data block is created containing the new updated content. Mapping of the deduplicated block is then changed to point to the new data block and the deduplicated block no longer points to the single copy of the data. This process is referred to as reduplication.

In one embodiment, storage system 800 further includes a storage manager or storage controller (not shown) configured to manage storage resources of storage system 800, such as, for example, storage space and processing resources (e.g., processor, memory, network resources). An administrator of management console or server remotely via a management or configuration interface (not shown) may access the storage manager or controller. The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

A replicator (not shown) can be part of system 800. The replicator replicates an original file system on a replicated file system. Both the replicator and clients or devices can access the replicated file system in a storage system. To perform file replication, the replicator may create, delete, or modify files on the replicated file system. In some embodiments, clients can read files on the replicated file system, but may not create, delete or modify files. In some embodiments, the replicator duplicates the replicated file system based on the original file system during initialization. In some embodiments, to efficiently initialize the replicated file system, the original file system is copied to the replicated file system via a network connection or using removable storage media such as backup tapes or optical storage discs.

A file system includes one or more file system blocks. Some of the file system blocks are data blocks, some file system blocks may be indirect block, as described above, or some file system blocks are free blocks that have not yet been allocated to any file in the file system. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block.

Figure 9:
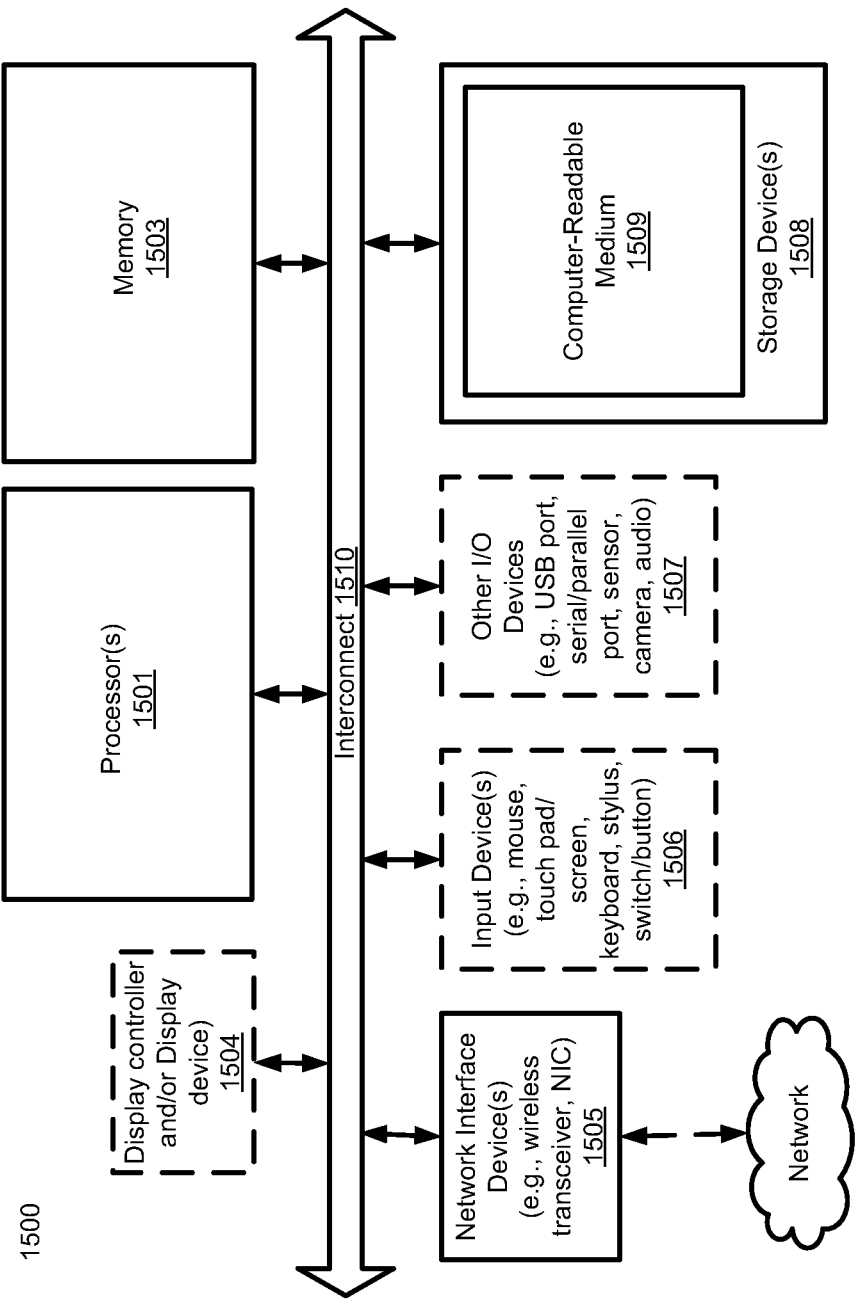
FIG. 9 is a block diagram illustrating a data processing system according to one embodiment.

FIG. 9 is a block diagram illustrating an example of a data processing system 1500 that may be used with one embodiment. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high-level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501 or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or a break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. In addition, a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software embodying any one or more of the methodologies or functions described herein.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Note that while system 1500 is illustrated with various components of a data processing system, it is not intended to represent any particular architecture or manner of interconnecting the components; as such, details are not germane to embodiments of the present invention. It will also be appreciated that network computers, handheld computers, mobile phones, servers, and/or other data processing systems, which have fewer components or perhaps more components, may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments described herein are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for backup, the method comprising:
   receiving, at a file server, a request to back up data from an application server, the file server providing storage services to files stored in a plurality of storage devices via one or more file sharing protocols;
   in response to the request, creating a snapshot of the data to be backed up;
   sending the created snapshot from a source storage device to a target storage system for storage; and
   sending a first notification to the application server indicating that the created snapshot has been backed up in the target storage system, wherein the application server sends a second notification to a backup server indicating that the data has been backed up and wherein the backup server is configured to manage backup of a plurality of storage systems.

2. The method of claim 1, further comprising sending metadata associated with the snapshot to the target storage system for storage of the metadata in the target storage system, wherein the first notification to the application server includes the metadata and wherein the second notification to backup server includes the metadata.

3. The method of claim 1, wherein, the snapshot is transmitted to the target storage system by the file system server.

4. The method of claim 3, wherein the one or more file sharing protocols include at least one of a common internet file system (CIFS) protocol or a server message block (SMB) protocol.

5. The method of claim 1, wherein the snapshot is transmitted to the target storage system by one or more processing units of the source storage device.

6. The method of claim 1, wherein the storage devices hosted by the file server comprise a plurality of disks.

7. The method of claim 1, wherein the snapshot of the data to be backed up is created by one or more processing units of the source storage device.

8. A non-transitory computer readable medium comprising instructions, which when executed by a processing system, cause the processing system to perform operations for backup, the operations comprising:
receiving, at a file server, a request to back up data from an application server, the file server providing storage services to files stored in a plurality of storage devices via one or more file sharing protocols;
in response to the request, creating a snapshot of the data to be backed up;
sending the created snapshot from a source storage device to a target storage system for storage; and
sending a first notification to the application server indicating that the created snapshot has been backed up in the target storage system, wherein the application server sends a second notification to a backup server indicating that the data has been backed up and wherein the backup server is configured to manage backup of a plurality of storage systems.

9. The non-transitory computer readable medium of claim 8, wherein the operations further comprise sending metadata associated with the snapshot to the target storage system for storage of the metadata in the target storage system, wherein the first notification to the application server includes the metadata and wherein the second notification to backup server includes the metadata.

10. The non-transitory computer readable medium of claim 8, wherein, the snapshot is transmitted to the target storage system by the file system server.

11. The non-transitory computer readable medium of claim 10, wherein the one or more file sharing protocols include at least one of a common internet file system (CIFS) protocol or a server message block (SMB) protocol.

12. The non-transitory computer readable medium of claim 8, wherein the snapshot is transmitted to the target storage system by one or more processing units of the source storage device.

13. The non-transitory computer readable medium of claim 8, wherein the storage devices hosted by the file server comprise a plurality of disks.

14. The non-transitory computer readable medium of claim 8, wherein the snapshot of the data to be backed up is created by one or more processing units of the source storage device.

15. A system, the system comprising one or more processing devices, the one or more processing devices being configured to:
receive, at a file server, a request to back up data from an application server, the file server providing storage services to files stored in a plurality of storage devices via one or more file sharing protocols;
in response to the request, create a snapshot of the data to be backed up;
send the created snapshot from a source storage device to a target storage system for storage; and
send a first notification to the application server indicating that the created snapshot has been backed up in the target storage system, wherein the application server sends a second notification to a backup server indicating that the data has been backed up and wherein the backup server is configured to manage backup of a plurality of storage systems.

16. The system of claim 15, wherein the one or more processing devices are further configured to send metadata associated with the snapshot to the target storage system for storage of the metadata in the target storage system, wherein the first notification to the application server includes the metadata and wherein the second notification to backup server includes the metadata.

17. The system of claim 15, wherein, the snapshot is transmitted to the target storage system by the file system server.

18. The system of claim 17, wherein the one or more file sharing protocols include at least one of a common internet file system (CIFS) protocol or a server message block (SMB) protocol.

19. The system of claim 15, wherein the snapshot is transmitted to the target storage system by one or more processing units of the source storage device.

20. The system of claim 15, wherein the storage devices hosted by the file server comprise a plurality of disks.

21. The system of claim 15, wherein the snapshot of the data to be backed up is created by one or more processing units of the source storage device.

* * * * *